April 30, 1946.    M. J. SMITH    2,399,578
LOCK VALVE
Filed Nov. 27, 1943
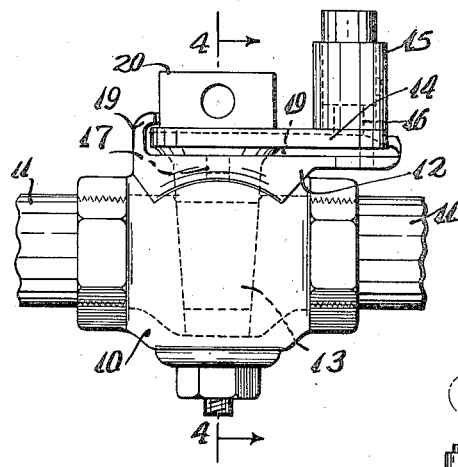
Fig-1-
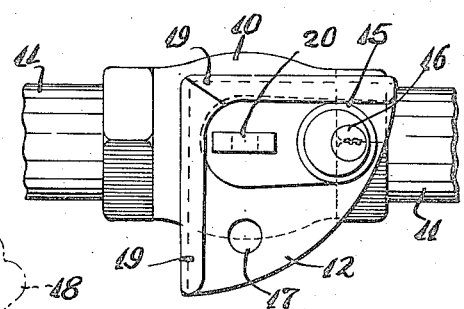
Fig-2-
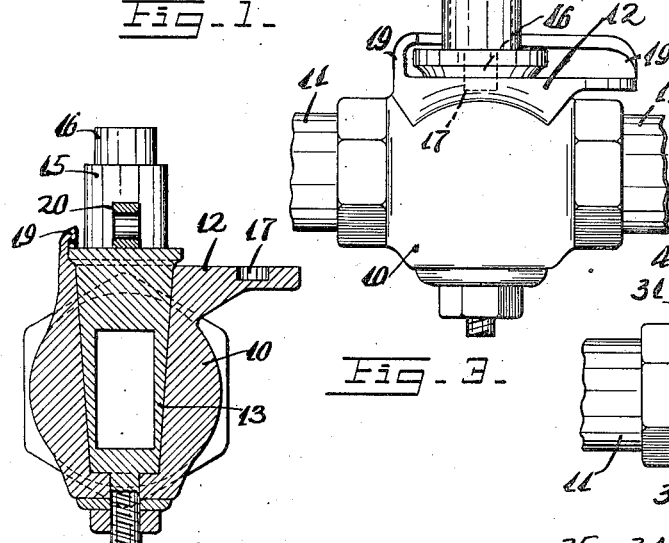
Fig-3-    Fig-4-
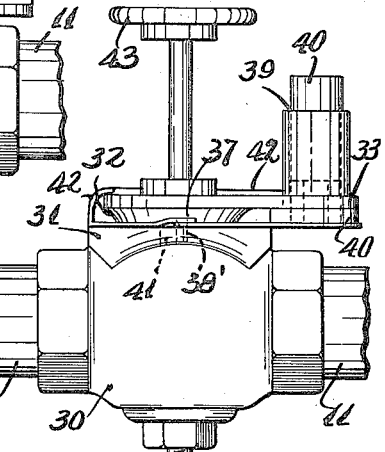
Fig-5-
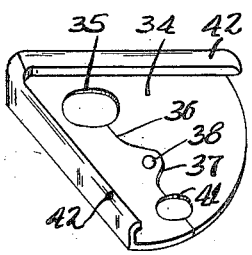
Fig-7-
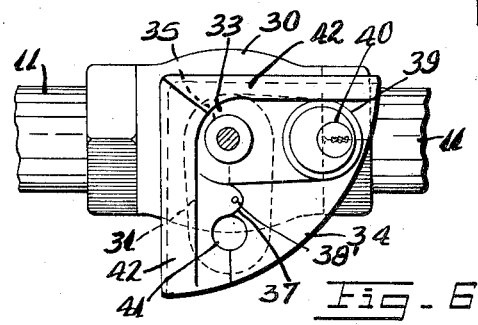
Fig-6-
INVENTOR.
Michael J. Smith
BY
Zoltan Holacheck
ATTORNEY Patented Apr. 30, 1946

2,399,578

UNITED STATES PATENT OFFICE 2,399,578

LOCK VALVE

Michael J. Smith, Morristown, N. J.

Application November 27, 1943, Serial No. 511,951

6 Claims. (Cl. 251—6)

This invention relates to new and useful improvements in a lock valve.

Heretofore, in the construction of lock valves it has been common practice to provide the valve body of the lock valve with a radially extending lug having an opening and to provide the turnable valve head with a radially extended handle provided with an opening adapted to be aligned with the opening in the lug of the valve body in the closed position of the valve, permitting a lock to be engaged through the openings for the purpose of locking the valve closed. The objection to this construction resides in the fact that when the valve is being opened it is necessary to completely remove the lock from the openings in the lug and handle so that the lock becomes separated from the valve, and ofttimes misplaced, rendering it impossible to again lock the valve until such time as the lock is found or replaced.

It is the purpose of this invention to provide the turnable valve head of the valve body with a radially extending handle upon which a plunger type cylinder lock is fixedly mounted and which is provided with an extendable bolt adapted to be engaged with a complementary keeper opening formed in a lug formed on the valve body in the closed position of the valve in a manner to lock the valve closed.

A further object of the invention proposes forming the lug of the valve body with an upwardly extending angle rim portion adapted to be engaged by the handle of the valve head in a manner to limit turning of the valve head to positions in which the valve is either opened or closed.

A further object of the invention proposes so constructing the lock that it may be arranged as an integral unit on new valves or so that it may be applied in the nature of an attachment to existing valves, eliminating the use of the separate lock member and its attendant annoyances pointed out above.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a side elevational view of the lock valve constructed in accordance with this invention.

Fig. 2 is a plan view of Fig. 1.

Fig. 3 is a view similar to Fig. 1 but illustrating the lock valve in its closed position.

Fig. 4 is a vertical sectional view of Fig. 1.

Fig. 5 is a view similar to Fig. 1 but illustrating a modification of the invention.

Fig. 6 is a plan view of Fig. 5.

Fig. 7 is a perspective view of the guard plate used in the form of the invention shown in Fig. 5.

The lock valve, according to this invention, includes a valve body 10 for connection in a pipe line 11 and which is provided with a flat arcuate top lug 12. A valve head 13 is turnably mounted through the valve body 10 and has its top end projecting coaxially from the top face of the arcuate top lug 12.

A handle 14 is fixedly mounted on the projected top end of the turnable valve head and is arranged in a manner to move across the top face of the top lug 12. A plunger type cylinder lock 15 is mounted on the outer free end of the handle 14 and is provided with a bottom extendable bolt 16. The bolt 16 of the cylinder lock 15 is adapted to be extended to engage a keeper opening 17 formed in the top lug 12 for locking the valve head 13 in a closed position, as shown in Fig. 3. A key 18, illustrated by the dot and dash lines in Fig. 3, may be used for retracting the bolt 16 from the keeper opening 17 to free the handle 14 to be used for turning the valve head 13 back to an open position.

The top lug 12 is formed along its sides with an upwardly extending angle rim portion 19 which is adapted to be struck by the sides of the handle 14 for limiting turning of the valve head 13 to positions in which the lock is either open or closed and prevent the valve head 13 and the handle 14 from being removed by unauthorized persons. In this form of the invention the valve head 13 is provided with an upwardly extended lug 20 upon which a turning tool may be engaged for turning the valve head 13 as desired.

The operation of this form of the device is as follows:

Normally, the valve will be in an open position, as illustrated in Fig. 1. To close the valve it is merely necessary to turn the handle 14 to the position illustrated in Fig. 3 and to lock the valve against being opened it is merely necessary to depress the bolt 16 of the cylinder lock 15 to engage this bolt with the keeper opening 17 formed in the top lug 12. A key similar to that illustrated by the dot and dash lines 18 in Fig. 3 is needed to retract the bolt 16 of the cylinder lock 15, and free the handle 14 to permit the valve head 15 to be turned back to its open position.

In Figs. 5–7 the lock valve is shown as an attachment for use in connection with existing valves. In this embodiment of the invention the valve includes a valve body 30 provided with a flat top lug 31 and a valve head 32 turnably mounted through the body and having its top end projecting above the top face of the top lug 31. The valve head 32 is further formed with a radially extended handle 33 movable across the top face of the flat top lug 31. A sheet metal arcuate guard 34 is provided with an axial opening 35 through which the projected top end of the valve head 32 is adapted to be passed, and has a split 36 extending from the opening 35 to its edge. The split 36 is adapted to be opened, permitting the guard 34 to be engaged about the valve head.

Overlapping portions 37 of the guard 34 are provided with aligned openings 38 through which a screw 38' is adapted to be passed. The screw 38' is adapted to be threadedly engaged into a complementary opening formed in the top lug 31 of the valve body 30 for securely mounting the guard 34 in a position upon the valve body 30. A plunger cylinder lock 39 is engaged through the opening formed in the outer end of the handle 33. The cylinder lock 39 in this form of the invention has an enlarged bottom end 40 engaging the bottom face of the handle 33 and resting on the top face of the guard 34, preventing the lock from being disengaged from the handle portion. The cylinder lock 39 carries a slidable bolt 40 adapted to be engaged with complementary aligned keeper openings 41 formed in the guard 34 and the top lug 31. The guard 34 in this form of the invention is also provided with an upwardly extending angle rim portion 42 along two sides to be engaged by the sides of the handle portion 34 to limit turning of the valve head to positions in which the valve is either open or closed and to prevent the valve head 32 and the handle 33 from being removed.

In this form of the invention the valve head 32 is further provided with an upwardly extended knob or hand wheel 43 by which the valve head 32 may be manually turned.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A lock valve, comprising a valve body for connection in a pipe line and having a flat arcuate top lug, a valve head turnably mounted through said body and having its top end projecting coaxially of said arcuate top lug, a handle mounted on the top of said valve head for moving across said top lug, a plunger cylinder lock vertically mounted on said handle, and said top lug having a vertical keeper opening for the vertical plunger of said lock for locking said valve head in its closed position.

2. In combination with a valve having a valve body with a flat top lug and a valve head turnably mounted through said body and having its top end projecting above said flat top lug and provided with a handle movable across said flat top lug, an arcuate guard having an axial opening for the top of said valve and a split from said opening to its edge permitting said guard to be inserted in position between said lug and handle and formed with a keeper opening, means for attaching said guard upon said top lug, a plunger cylinder lock mounted upon said handle and having a bolt engageable with said keeper opening in said guard for locking said valve head closed.

3. In combination with a valve having a valve body with a flat top lug and a valve head turnably mounted through said body and having its top end projecting above said flat top lug and provided with a handle movable across said flat top lug, an arcuate guard having an axial opening for the top of said valve and a split from said opening to its edge permitting said guard to be inserted in position between said lug and handle and formed with a keeper opening, means for attaching said guard upon said top lug, a plunger cylinder lock mounted upon said handle and having a bolt engageable with said keeper opening in said guard for locking said valve head closed, said means comprising a screw passed through aligned openings formed in overlapping portions of said guard and threadedly engaging a complementary opening in said lug.

4. In combination with a valve having a valve body with a flat top lug and a valve head turnably mounted through said body and having its top end projecting above said flat top lug and provided with a handle movable across said flat top lug, an arcuate guard having an axial opening for the top of said valve and a split from said opening to its edge permitting said guard to be inserted in position between said lug and handle and formed with a keeper opening, means for attaching said guard upon said top lug, a plunger cylinder lock mounted upon said handle and having a bolt engageable with said keeper opening in said guard for locking said valve head closed.

5. In combination with a valve having a valve body with a flat top lug and a valve head turnably mounted through said body and having its top end projecting above said flat top lug and provided with a handle movable across said flat top lug, an arcuate guard having an axial opening for the top of said valve and a split from said opening to its edge permitting said guard to be inserted in position between said lug and handle and formed with a keeper opening, means for attaching said guard upon said top lug, a plunger cylinder lock mounted upon said handle and having a bolt engageable with said keeper opening in said guard for locking said valve head closed, said guard being provided with an upwardly extended rim portion for limiting turning of said handle to positions in which said valve is opened or closed.

6. In combination with a valve having a valve body with a flat top lug and a valve head turnably mounted through said body and having its top end projecting above said flat top lug and provided with a handle movable across said flat top lug, an arcuate guard having an axial opening for the top of said valve and a split from said opening to its edge permitting said guard to be inserted in position between said lug and handle and formed with a keeper opening, means for attaching said guard upon said top lug, a plunger cylinder lock mounted upon said handle and having a bolt engageable with said keeper opening in said guard for locking said valve head closed, said guard being arranged to be separated at said split area to be engaged about said valve body.

MICHAEL J. SMITH.